(12) United States Patent
Steinwandel et al.

(10) Patent No.: US 9,511,871 B2
(45) Date of Patent: Dec. 6, 2016

(54) COMPOSITE STRUCTURE HAVING AN ICE PROTECTION DEVICE, AND PRODUCTION METHOD

(75) Inventors: Juergen Steinwandel, Uhldingen (DE); Martin Englhart, Schoenau (DE); Dietrich P. Jonke, Haar (DE); Helmut Piringer, Baldham (DE)

(73) Assignee: EADS Deutschland GmbH, Ottobrunn (DE)

( * ) Notice: Subject to any disclaimer, the term of this patent is extended or adjusted under 35 U.S.C. 154(b) by 433 days.

(21) Appl. No.: 14/122,216

(22) PCT Filed: May 24, 2012

(86) PCT No.: PCT/DE2012/000535
§ 371 (c)(1),
(2), (4) Date: Feb. 14, 2014

(87) PCT Pub. No.: WO2012/159608
PCT Pub. Date: Nov. 29, 2012

(65) Prior Publication Data
US 2014/0151353 A1    Jun. 5, 2014

(30) Foreign Application Priority Data
May 26, 2011    (DE) .......... 10 2011 103 297

(51) Int. Cl.
*B64D 15/12*    (2006.01)
*H05B 3/12*    (2006.01)
(Continued)

(52) U.S. Cl.
CPC ............ *B64D 15/12* (2013.01); *H05B 3/145* (2013.01); *H05B 3/18* (2013.01); *H05B 3/26* (2013.01);
(Continued)

(58) Field of Classification Search
None
See application file for complete search history.

(56) References Cited

U.S. PATENT DOCUMENTS 5,925,275 A    7/1999  Lawson et al.
8,664,573 B2*  3/2014  Shah .............. B64D 15/12
                                              219/482

(Continued)

FOREIGN PATENT DOCUMENTS

DE    10 2006 046 002 B4    3/2009
EP    0 872 417 A1          10/1998
(Continued)

OTHER PUBLICATIONS

International Search Report dated Dec. 21, 2012 with partial English translation (Eight (8) pages).
(Continued)

*Primary Examiner* — Joseph M Pelham
(74) *Attorney, Agent, or Firm* — Crowell & Moring LLP

(57) ABSTRACT

An ice protection system for de-icing an aircraft and/or for keeping the aircraft free of ice includes a composite structure for an aircraft component and a structural element of an aircraft with an ice protection system that is integrated in the composite structure. The ice protection system includes a flat surface-like electric heating element that is embedded in the composite structure below an outer layer of an outer surface of the aircraft component.

14 Claims, 3 Drawing Sheets

(51) Int. Cl.
*H05B 3/28* (2006.01)
*H05B 3/14* (2006.01)
*H05B 3/18* (2006.01)
H05B 3/26 (2006.01)

(52) U.S. Cl.
CPC ............. *H05B 3/28* (2013.01); *H05B 2214/02* (2013.01); *H05B 2214/04* (2013.01); *Y10T 29/49083* (2015.01)

(56) References Cited

U.S. PATENT DOCUMENTS

| | | |
|---|---|---|
| 2007/0210073 A1 | 9/2007 | Hubert et al. |
| 2011/0024409 A1 | 2/2011 | Shah et al. |
| 2011/0114895 A1 | 5/2011 | Lengsfeld |
| 2012/0312925 A1* | 12/2012 | Asfia ................ B64D 15/02 244/134 R |
| 2013/0028738 A1* | 1/2013 | Nordin ............... F03D 11/0025 416/39 |
| 2013/0043342 A1* | 2/2013 | Nordin ................ B64C 3/20 244/1 A |

FOREIGN PATENT DOCUMENTS

| | | |
|---|---|---|
| GB | 2 252 285 A | 8/1992 |
| WO | WO 99/15405 | 4/1999 |

OTHER PUBLICATIONS

German-language Written Opinion (PCT/ISA/237) dated Dec. 21, 2012 (Seven (7) pages).

\* cited by examiner

COMPOSITE STRUCTURE HAVING AN ICE PROTECTION DEVICE, AND PRODUCTION METHOD

BACKGROUND AND SUMMARY OF THE INVENTION

Exemplary embodiments of the invention relate to a composite structure for an aircraft component, in order to form a structural element of an aircraft, as well as a method for producing the composite structure.

The invention deals, in particular, with the problem of ice forming on an aircraft and, hence, also relates to the field of ice protection systems that include both systems for preventing the formation of ice on an aircraft as well as systems for de-icing an aircraft.

Ice forms on the leading edges of wings, tails and horizontal stabilizers, when an aircraft, such as an airplane or a helicopter, flies through a cloud that contains supercooled water droplets. The ice forms, as the supercooled water droplets of clouds touch the aircraft. This contact introduces energy into the droplet and causes them to change from the liquid state to the solid state and, thus, to become ice. If a layer of ice grows, it has an adverse effect on the air flow over the surface concerned. If the layer is large enough, it can cause carrying or lifting problems or handling problems for the aircraft. In the worst case scenario the net result of such problems can be a stall and loss of lift force.

The term de-icing is defined as a process of removing the accumulation of frozen material, like snow or ice, from a surface.

The term anti-icing, i.e. the prevention of ice formation, is defined as the process of providing protection against the formation of accumulations of frozen material, like snow or ice, on the surface.

Typically de-icing operations and methods for preventing the formation of ice are carried out on the ground and include mechanical methods and de-icing by means of infrared radiation, the application of dry or liquid chemicals, salt, alcohols, or heated glycol compounds or glycol solutions by spraying.

For example, a protective layer of anti-icing fluid is applied for limited protection. For this purpose, airplanes or any other aircraft are de-iced, in particular, before take-off, especially under cold weather conditions. The de-icing of the aircraft wings both on the ground (before the flight) as well as during the flight is extremely relevant to the safety, because otherwise the formation of ice may cause the airplane to stall during the flight, so that it is more likely to crash.

Ice protection systems for preventing the formation of ice during the flight include directing hot bleed air from the engines through inner lines along the edge of the wing or applying additional heating elements that are embedded in rubber layers and mounted externally on the leading edges of aircraft parts, such as wings or propellers and helicopter rotor blades.

There are also electromechanical ice protection systems, including the so called "weeping wing" systems, where a glycol based anti-icing fluid is pumped through small openings in the wing profile. Other electromechanical ice protection systems include the so called electromechanical expulsion de-icing systems (EMEDS) systems that use a mechanical force to knock the ice off the wing surface. In this case actuators are typically installed under the skin of the structure. The actuator is moved to induce a shock wave in the protected surface. There are also hybrid systems that combine such an ice expulsion system with electric heating elements.

Known ice protection systems are described briefly below.

Pneumatic de-icing profiles, which remove ice by means of surface movements induced by air pressure, can only be used for a low speed aircraft.

Widely used are the so called "bleed air" systems, where hot air can be diverted from the engines and used for de-icing or to prevent ice formation. However, the engine bleed temperature is usually too high for aircraft components made of composite materials, such as carbon fiber-reinforced plastic (CFRP) structures. Diverting the hot air results in a degradation of the efficiency of the engine.

The heating elements that are embedded in rubber layers have drawbacks in terms of low electrical efficiency, in terms of a high weight and with regard to installing the heating elements. The heating elements can be dislodged from the aircraft during the flight. Such heating elements cannot be installed on just any surface structure. That is, the design freedom with respect to surfaces that are to be protected is extremely limited. The heating surfaces have a short service life. Such ice protection systems require high production and maintenance costs and do not lend themselves to small aircraft components, such as dynamic pressure sensors or the like.

The weeping wing systems constantly consume fluids during the flight, need nozzles on the leading edge of the wing, and pollute the environment. They are maintenance intensive and necessitate a high weight, since the fluid must be refilled and carried along.

The EMEDS systems have disadvantages in terms of their high weight and with respect to the need for special adaptation of the composite structures to the actuators and their knocking movements. In addition, a de-icing control unit and an energy storage unit are required. Moreover, such systems cannot prevent the formation of ice, but rather can only remove the ice that has accumulated. The removed ice can damage or destroy the engine rotors during the flight.

Exemplary embodiments of the present invention are directed to an ice protection system for an aircraft that avoids at least some of the aforementioned drawbacks.

The invention provides a composite structure for an aircraft component, in order to form a structural element of an aircraft having an ice protection system that is integrated in the composite structure for the purpose of preventing the formation of ice and/or for de-icing. In this case the ice protection system comprises a flat surface-like electric heating element that is embedded in the composite structure below an outer layer of an outer surface of the aircraft component.

Working on this basis, the invention includes a heating unit that is also integrated in a composite structure in order to construct an aircraft component. To this end, a flat surface-like electric heating element is installed below a protective layer, such as a finish top coat, and, as a result, is embedded in the composite structure.

It is preferred that the electric heating element be selected from a group of heating elements that comprise a textile surface structure of electrically conductive fibers,
a conductive layer made of a carbon fiber-reinforced graphite,
a plastic layer, which is made electrically conductive by filling with graphite,
a conductive layer made of a matrix material that is loaded with nanotubes, and a layer comprising at least one conductive path that is formed by nanotubes, which are arranged side by side in such a way that they are distributed over the surface of the layer.

Even more highly preferred is that the heating element is designed as a textile surface structure that can be easily embedded in the composite structure. Preferably the textile surface structure comprises a carbon felt. Such a surface structure can be infiltrated by a matrix material or a cover layer material during application and, as a result, can be almost integrated in the composite structure.

The outer layer is preferably a highly stable thermoplastic material. Especially suitable for this purpose are polyether ketones, for example a polyether ether ketone layer (PEEK). Such materials are easy to shape, on the one hand, and, on the other hand, can be applied in the liquid state and yet are sufficiently temperature stable, in order to embed the heating element in such materials.

The composite structure comprises preferably a carbon fiber-reinforced plastic material as a substrate that forms the support structure for the aircraft component, which is to be de-iced and/or protected against the formation of ice.

Preferably the heating element is connected to the substrate by means of an electrically insulating layer. The layer can be, for example, an insulating layer made of an epoxy material.

When a latent heat storage layer is also incorporated in the composite structure system, the heat of the heating element can be stored in the heat storage layer, so that even after the heating element has been turned off, ice does not form. For this purpose a latent heat storage layer is used preferably with a material that can store heat by means of a phase transition.

Furthermore, the invention provides an aircraft component, in order to form a structural element of an aircraft having an ice protection system integrated in the composite structure to prevent the formation of ice and/or to de ice. In this case the ice protection system comprises a flat surface-like electric heating element that is embedded in the composite structure below an outer layer of an outer surface of the aircraft component.

The electrical contact with the heating element is made by means of at least one contact element that is embedded in the composite structure below an outer layer of an outer surface of the aircraft component. Preferably the contact element is a thermally sprayed contact strip that is electrically connected to the heating element.

Preferably the heating element has a modular type of design and comprises a plurality of flat surface-like heating elements. The electrical contact is made jointly by means of at least one contact element for all of the heating elements or separately for each heating element.

Preferably the method comprises the steps:
providing a substrate made of a fiber-reinforced composite material, in particular a CFC material;
applying an electrically conductive layer, in order to form the heating element;
coating the electrically conductive layer with a cover layer, in order to form the outer surface of the aircraft.

At least one contact element is applied in order to make electrical contact with the electrically conductive layer. Preferably the contact element is applied after the electrically conductive layer has been applied. Preferably the contact element is coated with a cover layer, in order to form the outer surface of the aircraft.

The electrically conductive layer is applied advantageously in a modular fashion. Preferably at least one contact element is applied between the individual regions of the modular conductive layer.

This is done preferably in such a way that the substrate is coated with an electrically insulating material prior to the application of the electrically conductive layer.

Preferably the electrically conductive layer is formed by or with a material that is selected from a group of materials that include
a textile surface structure made of electrically conductive fibers,
graphite reinforced with carbon fibers,
an electrically conductive plastic due to graphite filling, and
nanotubes, in order to form electrically conductive paths.

BRIEF DESCRIPTION OF THE DRAWING FIGURES

The invention is explained in detail below with reference to the accompanying drawings, in which FIG. 1 is a schematic drawing of a cross sectional view of a first embodiment of a composite structure for a component of an aircraft with an ice protection system.

DETAILED DESCRIPTION

Figure 1:
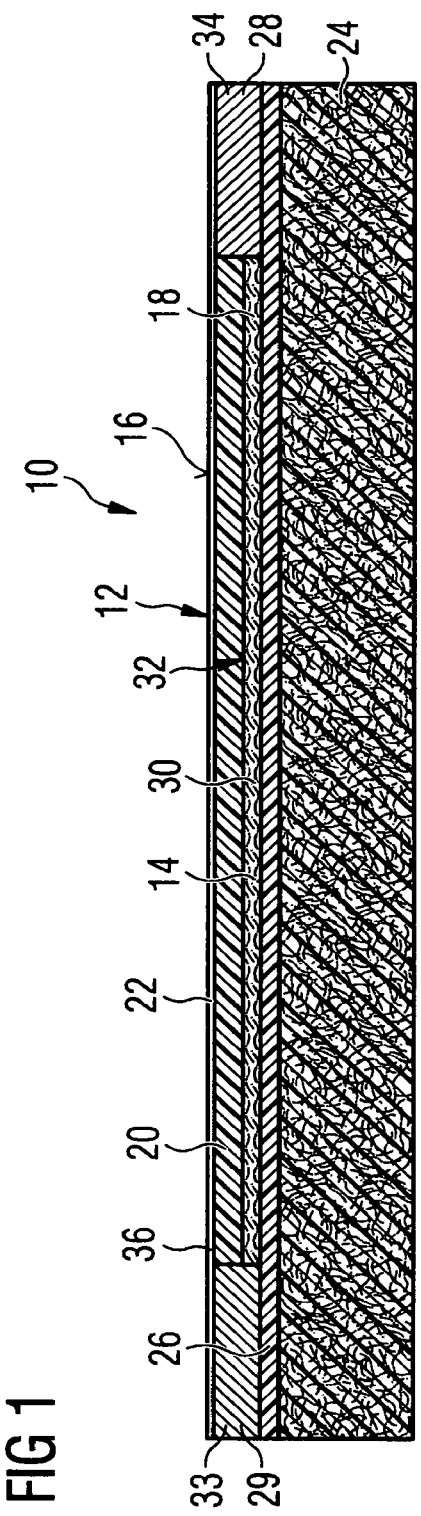

The illustrated figures show a number of different embodiments of composite structures 10 made of composite materials, in order to form a component of an aircraft. These composite structures 10 are provided with an ice protection system 12 embedded in the composite structure. The ice protection system 12 is designed as a system for de-icing and/or as a system to prevent the formation of ice and, thus, is used to prevent the formation of ice on surfaces of the aircraft component having the composite structure 10 or is used to remove the ice that has formed on such surfaces.

The ice protection system 12 has an electric heating element 14 that is electrically conductive and that generates heat upon applying or inducing an electric voltage, for example, from the aircraft's on-board electrical system by means of its electrical resistance. This heat is used to heat the outer surface 16 of the composite structure 10, in order to remove in this way the ice that has formed on the outer surface 16 or to prevent the formation of ice from the onset.

The electric heating element 14 is a two-dimensional sheet, in order to form a heating layer 18 that is arranged below the outer cover layer 20 of the composite structure. The outer cover layer 20 is formed, in particular, by means of a finish top coat 22. The construction of a first embodiment of the composite structure 10 is explained in detail below with reference to the drawing in FIG. 1.

The composite structure 10, shown in FIG. 1, has a composite material substrate 24 made of a fiber reinforced composite material.

In particular, the composite material substrate 24 is formed from a carbon fiber reinforced plastic material. The plastic material is, in particular, epoxy resin. Correspondingly the composite material substrate 24 is formed, in particular, from a CFRP material.

An insulating layer 26, made of an electrically insulating material, is applied on this composite material substrate 24. The insulating layer 26 is formed, in particular, from epoxy resin.

Between the composite material substrate 24 and the cover layer 20 there is the heating layer 18, which comprises the electric heating element 14 and the contact elements 28, 29, in order to make electrical contact with the electric heating element 14.

The electric heating element 14 is formed, in particular, by a textile surface structure 30 made of electrically conductive fibers.

In the embodiment of the composite structure 10 depicted in FIG. 1, the textile surface structure 30 is a felt, which is integrated in the composite structure 10 and is made of electrically conductive fibers, in particular carbon fibers. Working on this basis, the electric heating element 14, depicted in FIG. 1, provides a carbon fiber felt 32, which heats up upon application of voltages by means of the contact elements 28, 29 due to the current flowing through the felt 32, in order to heat the outer surface 16 in this way.

The contact elements 28, 29 are formed from thermally sprayed contact strips 33, 34. The cover layer 20 is formed by a polyether ketone coating. Preferably a PEEK coating 35 is provided. This PEEK coating offers a high thermal and mechanical stability and high erosion resistance.

Therefore, in the first embodiment the ice protection system 12 comprises a felt 32, which is integrated in the composite structure 10, as a flat surface-like heating element 14.

Furthermore, lightning strike protective systems can also be introduced into the composite structure 10 in a manner analogous to, for example, the lightning strike protective systems that are described and illustrated in German patent application DE 10 2006 046 002B4 or the state of the art cited in said German patent application.

In the case of the design variants (not shown in detail) of the first embodiment shown in FIG. 1, the carbon fibers can be coated with ferromagnetic metals, and the heating element 14 can be combined with a lightning strike protective structure.

Instead of making contact with the electric heating element 14 by means of the contact elements 28, 29, the electric heating element 14 can also be driven inductively without direct electrical contact, for example, by means of eddy currents induced by means of the heating element 14. The composite material substrate 24 can also include other fibrous reinforcing materials, instead of the described carbon fibers. Moreover, another matrix material can also be provided.

The composite structure 10 that is provided with the electric heating element 14 is designed to consume enough heat output to de-ice and to prevent the formation of ice. For example, at least 100 W/dm$^2$ of heat output can be introduced. The composite structure 10 is designed in its entirety in such a way that even correspondingly higher heat output values can be managed without difficulty.

The composite structure 10, shown in FIG. 1, has been successfully tested for its suitability as an ice protection system 12 by means of prototypes.

In one example the base material that was selected for the electric heating element 14 is a non-woven carbon felt 32 that was laid in the wet state with short fibers on the composite material substrate 24 with or without the interposition of the insulating layer 26. In forming the base, the carbon felt 32 has a mass of 20 to 40 g/m$^2$, in particular 30 g/m$^2$, and is provided with a thickness of 0.05 to 0.25 mm, in particular 0.15 mm.

The electric heating element 14 can be laid over a very small area and also over a large area. For example, a small scale heating element 14 can exhibit a length of 10 to 20 cm, in particular 15 cm, and a width of 5 to 30 cm, in particular 10 cm. An effective heating length between the contact elements 28, 29 can be, for example, 10 to 20 cm, in particular, 12 cm. A felt having a thickness of, for example, 15 mm can be laid in one or more layers. When a double layer of such a felt is laid, the result is 100 mm×0.3 mm=30 mm$^2$, as an example of a cross section of the heating element 14.

The contact strips 33, 34 can be fabricated, for example, from metal, such as copper. Some examples of possible dimensions for the contact strips include a length of about 100 mm, a width of about 15 mm and a thickness of about 0.2 mm. All of the aforementioned values are sample values. Preferred ranges can move in a range of ±50% of these values.

In order to apply the contact strips 33, 34 a preferred embodiment provides, first and foremost, a stiffening by means of an aqueous adhesive solution. The application of the contact strips 33, 34 can be performed by electric arc spraying, sintering, screen printing, PVD, CVD, plasma deposition, etc. The bonding of the contact strips to the composite material substrate 24 can be performed, for example, by means of an epoxy resin of the insulating layer 26.

With a prototype of the design described above, a passage of electrical current of 5.8 A is achieved at an operating voltage of 16 V direct current. It has been demonstrated with tests that by providing the carbon nanotubes in the aqueous adhesive solution, the passage of electrical current can be improved by up to 15%.

An amount of 2.75Ω has been measured as the total resistance, where the contact strips have a resistance of 0.2Ω. The net result is a heat output of about 92.8 W, an amount that is equivalent to a power per unit surface of 77 W/dm2. For the amount of time that it takes to heat up, it could be measured that a temperature of 40° C. has been reached in about 30 seconds with a temperature gradient of 30° C.

Figure 2:
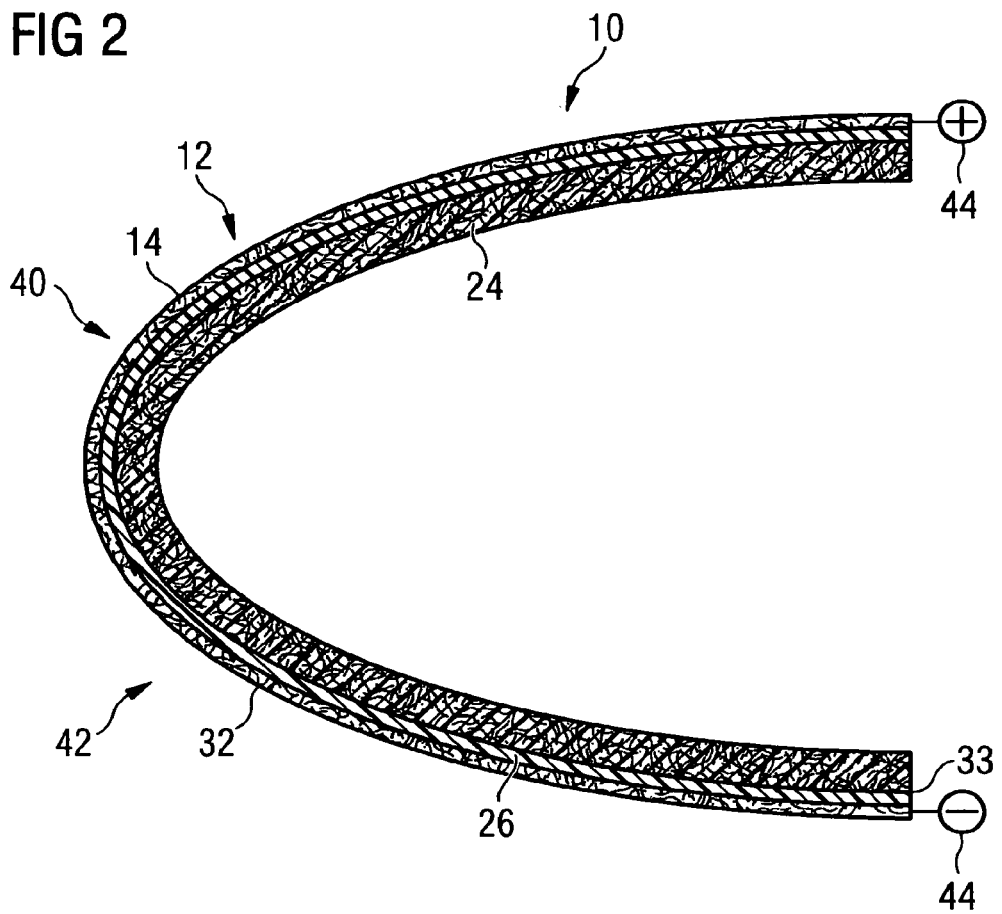
FIG. 2 is a schematic drawing of the use of the composite structure, shown in FIG. 1, on a leading edge of a wing profile of an aircraft.

FIG. 2 shows an example of the composite structure 10 being used in a wing profile of an aircraft that is not shown. FIG. 2 shows the cross section of the leading edge region 40 of the wing 42. The wing 42 constitutes an example of an aircraft component, which is formed from a CFRP composite material as a supporting structural element. FIG. 2 shows the composite structure 10, which, therefore, builds up the leading edge region 40 as a structural element.

In this case the composite material substrate 24 represents the supporting component, on which the insulating layer 26 is applied, and then the electric heating element 14 is applied on this insulating layer. One example of such an electric heating element 14 is the carbon felt 32.

The cover layer 20 with the finish top coat 22 is not shown yet in FIG. 2. In the course of applying this cover layer 20 the heating element 14, which is formed from the electrically conductive fibers as the textile surface structure 30, is also securely integrated in the composite structure 10 and arranged close to the outer surface 16, but is provided below the outer surface 16 in such a way that said heating element is protected and integrated.

Instead of the epoxy resin that is mentioned above as an example of the material of the insulating layer 26 in FIG. 1, a silicone gel can also be provided as the insulating layer 26. In such a case the ice protection system 12 could be installed on the composite material substrate 24 in such a way that it can be removed.

In addition, FIG. 2 also shows the electrical connection 44 of the contact elements 28, 29 to the power supply system of the aircraft.

The advantages of the ice protection system 12, according to one or more of the embodiments shown herein, are, for example:
- a high electrical efficiency due to a heating element 14 that is fastened outside the composite material substrate 24;
- a high ice melting capacity;
- low weight;
- the heating element 14 is integrated in the composite structure 10;
- the heating elements 14 can also be secured inside the leading edge;
- the heating element 14 cannot detach itself from the aircraft during the flight;
- the ice protection system 12 can also be applied to small components, such as dynamic pressure sensors;
- the safety of air traffic is improved;
- there is a high degree of design freedom with respect to the surface shape of heating elements;
- the ice protection system has no impact on the flow of air along the aircraft component, such as the wing 42, which is provided with said ice protection system;
- the surfaces that are provided with the ice protection system 12 have a long service life;
- there is no need for de-icing fluids;
- the ice protection system 12 is environmentally friendly;
- it is possible to provide a simple and lightweight de-icing control unit, for example, by means of temperature controlled resistors, such as NTC resistors or PTC resistors or more specifically negative temperature control thermistors and/or positive temperature control thermistors; and such a control unit can be easily integrated as part of the ice protection system 12;
- a fail-safe system with the highest safety standards can be provided;
- the manufacturing cost can be kept low, because the construction of the ice protection system 12 can be integrated in the production process of the composite structure 10; and no other additional method is necessary.

More alternative options for constructing the composite structure 10 are explained in detail below with reference to the drawings shown in FIGS. 3 to 9.

Figure 3:
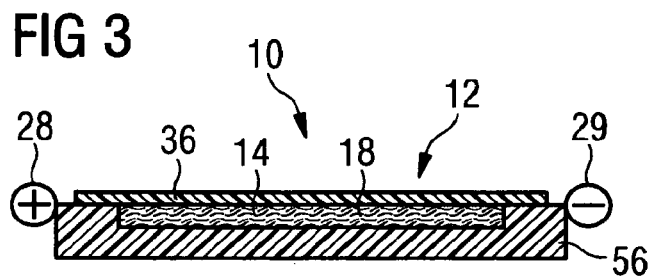
FIG. 3 is a simplified schematic drawing of an additional embodiment of the composite structure.

In the second embodiment shown in FIG. 3, a carbon felt 32 is embedded as the heating element 14 in a thermoplastic resin, for example PPS or PAA, and covered with the PEEK coating 36 as the finish top coat 22. The carbon felt 32 is, for example, a felt that is available under the tradename SIG-RATEX®. The thermoplastic resins for embedding this felt 32 are available on the market, for example, under the tradename FORTRON® or IXEF®. The felt 32 is generally embedded in a synthetic plastic material 56.

Figure 4:
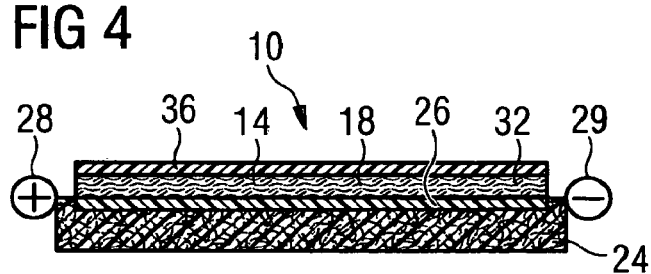
FIG. 4 is a schematic drawing of a third embodiment of the composite structure with an ice protection system.

In the third embodiment, shown in FIG. 4, a silicone rubber, which vulcanizes into a silicone gel, is provided as the material for the insulating layer 26. One example of said silicone rubber is the material that is available under the brand name SIL-Gel®. Hence, the composite structure 10, according to the third embodiment shown in FIG. 4, is constructed from the bottom to the top as follows: the composite material substrate 24; the insulating layer 26 using the SIL-Gel, the felt 32 made of SIGRATEX and the finish top coat 22 in the form of a PEEK coating 36.

Figure 5:
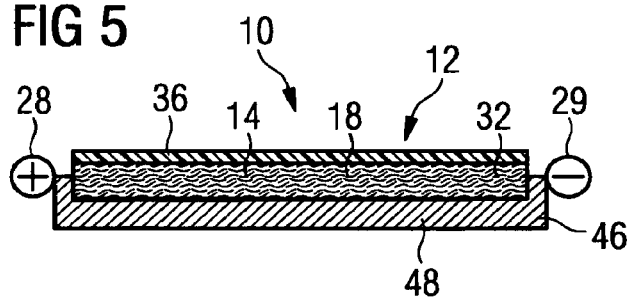
FIG. 5 is a schematic drawing of a fourth embodiment of the composite structure.

In the fourth embodiment of the composite structure 10 shown in FIG. 5, a latent heat storage device 46 is also provided additionally below the heating layer 18 with the electric heating element 14. The latent heat storage device 46 is designed as a latent heat storage panel 48 that can store the latent heat by using an embedded material that has a phase transition at the temperature of interest.

Such a latent heat storage panel 48 is formed, for example, from a composite material made of a material, which exhibits a phase transition occurring at the temperatures under discussion herein, and carbon. Such a latent heat storage panel 48 is available on the market, for example, under the brand name ECOPHIT®.

Figure 6:
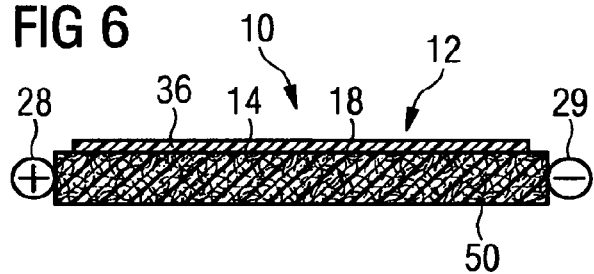
FIG. 6 is a schematic drawing of a fifth embodiment of the composite structure.

In the fifth embodiment shown in FIG. 6, an electrically conductive layer made of a fiber reinforced material 50 is provided for forming the electric heating element 14. The electrically conductive layer 50 is formed, for example, from a carbon fiber-reinforced carbon material, in particular carbon fiber reinforced graphite. An example of such a material is available on the market under the tradename SIGRA-BOND® CFC. This electrically conductive layer 50 can be used, rather than the carbon felt 32, in the composite structure 10 shown in FIG. 1.

Figure 7:
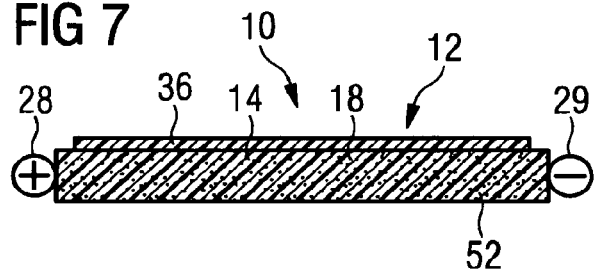
FIG. 7 is a schematic drawing of a sixth embodiment of the composite structure.

In the sixth embodiment shown in FIG. 7, the composite structure 10 is designed in a manner analogous to the composite structure of the fifth embodiment. In this case, instead of the electrically conductive layer 50 with fiber reinforced materials, an electrically conductive layer 52 made of graphite-filled high performance plastic is used. For example, a graphite filled thermoset that is to be processed by injection molding is used. In general, electrically conductive thermoplastic or thermosetting materials can be used as the heating element 14. One example of a suitable material is available on the market under the tradename RIDURID®.

Figure 8:
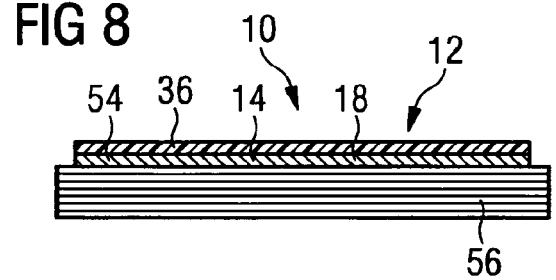
FIG. 8 is a schematic drawing of a seventh embodiment of the composite structure.
Figure 9:
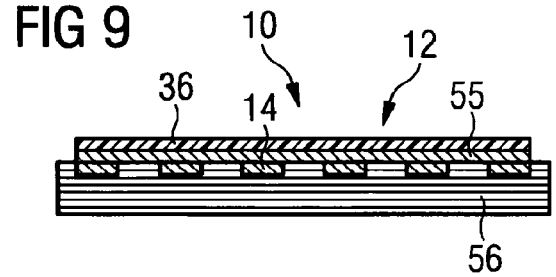
FIG. 9 is a schematic drawing of an eighth embodiment of a composite structure.

In the embodiments shown in FIGS. 8 and 9, the passage of electrical current of the heating element 14 is produced by using carbon nanotubes. By filling a synthetic plastic material, such as a thermoplastic material, with nanotubes it is possible to obtain an electrically conductive plastic composite material. In the seventh embodiment shown in FIG. 8, such a nanotube-filled electrically conductive plastic composite material 56 is used as the electrically conductive layer 54, rather than the layers 50, 52 of the fifth and sixth embodiment as the heating element 14.

In the eighth embodiment shown in FIG. 9, this nanotube-filled electrically conductive plastic composite material 56 is inserted in the form of a zigzag as the path through a matrix layer of unfilled plastic material 55 or unfilled plastic composite material. Suitable synthetic plastic materials that can be filled with nanotubes or that form the matrix layer 56 are, for example, the aforementioned PPS materials, such as FORTRON®, or PAA materials, such as IXEF®.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 composite structure
12 ice protection system
14 electric heating element
16 outer surface
18 heating layer
20 cover layer
22 finish top coat
24 composite material substrate
26 insulating layer
28 contact element
29 contact element
30 textile surface structure
32 carbon felt
33 contact strips
34 contact strips
36 PEEK coating
40 leading edge region
42 wing
44 connection to the power supply of the aircraft
46 heat storage device
48 latent heat storage panel
50 electrically conductive layer of a fiber-reinforced material
52 electrically conductive layer of a graphite-filled plastic
54 electrically conductive layer of a thermoset filled with nanotubes
55 conductive plastic material filled with nanotubes
56 unfilled plastic material or plastic composite material

The invention claimed is:

1. A composite structure for an aircraft component that is a structural element of an aircraft, the composite structure comprising:
   a latent heat storage layer composed of a material that stores latent heat due to a phase transition;
   an outer surface having an outer layer; and
   an ice protection system integrated in the composite structure, wherein the ice protection system is configured to prevent formation of ice or to de-ice the structural element,
   wherein the ice protection system has a flat surface-like electric heating element embedded in the composite structure below the outer layer of the outer surface of the aircraft component.

2. The composite structure of claim 1, wherein the electric heating element is selected from a group of heating elements that comprise
   a textile surface structure of electrically conductive fibers,
   a conductive layer of a carbon fiber-reinforced graphite,
   a plastic layer with a graphite filling material,
   a conductive layer of a matrix material loaded with nanotubes, and
   a layer comprising at least one conductive path of plastic filled with nanotubes, wherein the conductive path extends through the layer in a distributed manner.

3. The composite structure of claim 2, wherein the textile surface structure comprises a carbon felt.

4. The composite structure of claim 1, wherein the outer layer is superposed on the electric heating element, and the outer layer comprises a polyether ether ketone.

5. The composite structure of claim 1, further comprising:
   a composite material substrate made of a carbon fiber-reinforced plastic material on which the heating element is arranged.

6. The composite structure of claim 5, further comprising:
   an insulating layer comprised of an epoxy resin arranged between the heating element and the composite material substrate.

7. The composite structure of claim 1, further comprising:
   at least one contact element in electrical contact with the heating element, the at least one contact element is embedded in the composite structure below the outer layer of the outer surface of the aircraft component.

8. The composite structure of claim 1, wherein the heating element has a modular structure and comprises a plurality of flat surface-like heating elements.

9. A method for producing an ice protection system for an aircraft, the method comprising:
   forming an outer skin of the aircraft by embedding a flat surface-like electric heating element in a composite structure; and
   adding, to the composite structure, a latent heat storage layer composed of a material that stores latent heat due to a phase transition.

10. The method of claim 9, further comprising:
    providing a composite material substrate made of a carbon fiber-reinforced composite material;
    forming the heating element by applying an electrically conductive layer;
    forming an outer surface of the aircraft by coating the electrically conductive layer with a cover layer.

11. The method of claim 10, further comprising:
    applying at least one contact element to form an electrical contact with the electrically conductive layer.

12. The method of claim 10, wherein the electrically conductive layer is applied in a modular fashion.

13. The method of claim 10, wherein the composite material substrate is coated with an electrically insulating material prior to the application of the electrically conductive layer.

14. The method of claim 10, wherein the electrically conductive layer is formed by or with a material that is selected from a group of materials that include
    a textile surface structure made of electrically conductive fibers,
    graphite reinforced with carbon fibers,
    an electrically conductive plastic due to graphite filling, and
    nanotubes, in order to form electrically conductive paths.

* * * * *